United States Patent [19]
Booth et al.

[11] Patent Number: 5,353,669
[45] Date of Patent: Oct. 11, 1994

[54] SHEAR FOR SHEET MATERIAL AND METHOD FOR FORMING A TRANSFORMER CORE FROM THE SHEET MATERIAL

[76] Inventors: Kenneth Booth; John Barris, both of 116 Sanford Street, Winnipeg, Manitoba R3E 2Z9, Canada

[21] Appl. No.: 12,399

[22] Filed: Feb. 2, 1993

[51] Int. Cl.$^5$ .............................................. B26D 1/09
[52] U.S. Cl. ........................................ 83/132; 83/213; 83/620; 83/694
[58] Field of Search .................... 83/620, 694, 549, 39, 83/42, 622, 213, 132

[56] References Cited

U.S. PATENT DOCUMENTS

| | | | |
|---|---|---|---|
| 3,958,482 | 5/1976 | Claesson | 83/620 X |
| 4,338,840 | 7/1982 | Farrel, Sr. et al. | 83/622 |
| 4,632,047 | 12/1986 | Seaman | 83/620 X |
| 4,729,273 | 3/1988 | Fazis | 83/620 X |
| 4,738,173 | 4/1988 | Kiuchi | 83/620 X |

Primary Examiner—Richard K. Seidel
Assistant Examiner—Kenneth E. Peterson
Attorney, Agent, or Firm—Adrian D. Battison; Stanley G. Ade; Murray E. Thrift

[57] ABSTRACT

A system is disclosed for manufacturing fully mitered step lap transformer cores which are formed from separate sheets which are laid face to face to form the separate pieces of the core. The system includes an X-shaped shear arrangement including four blades lying on an X-shape and meeting at a center point. Upstream of the X-shear is provided a hole punch so the punched hole can be moved to the center point of the X-shear and any two, three or four of the blades actuated to provide a required shape in the material to be cut. The X-shear allows the formation sequentially of all of the five sheets necessary for the core and then these are stacked simultaneously by a lifting carriage which lifts each sheet in turn while orienting it properly relative to the other sheets carried to form a single layer of the core which is then deposited upon a stacking table.

6 Claims, 6 Drawing Sheets

FIG. 10 ced to the sheet cutting machine then forwards the unreeled layer
SHEAR FOR SHEET MATERIAL AND METHOD FOR FORMING A TRANSFORMER CORE FROM THE SHEET MATERIAL This invention relates to a cutting shear for cutting sheet metal into a plurality of separate layer pieces or laps and to a method for assembling the layer pieces into a transformer core.

Transformer cores are formed from a plurality of separate layers of metal sheet which are laid face to face. The transformer core includes a bottom yoke on which is mounted a first end leg, a central leg and a second end leg, the legs being arranged parallel and at right angles to the bottom yoke. In the finished transformer, the windings are wrapped around the core legs and subsequently a top yoke is applied to the end of the legs remote from the bottom yoke.

Designs for cores have developed over the years leading to the manufacture of what is known as a fully mitered, step lap core. In this construction the ends of the yokes and the ends of the legs are mitered at 45° to provide an effective connection between the legs and the yokes. The ends of the central leg include a V-shaped miter with a similar shape cut into the center portion of the top and bottom yoke. This construction is known as the fully mitered core.

In most cases, the yokes and the legs are each formed from a plurality of the layers which have widths which are varied so that the outside shape of the finished yoke or leg is generally cylindrical. As it is not practical to provide an infinite variation in the widths of the layers, the outside of the leg or yoke includes a number of steps where a plurality of layers of a constant thickness are applied together. In other arrangements the core pieces are of rectangular cross-section.

In a step lap construction, the length of the sheets turning the legs are kept constant, but the depth of the V groove and the length of the yokes is varied slightly from the length of the next previous layer and from the next subsequent layer. In this way the next layer of each leg slightly overlaps the previous layer of the yoke to provide what is known as a "step lap" construction. Generally the step lap construction includes a number of these layers which gradually vary the length of the yoke and the number of steps can be selected according to design, the total number forming one "book" of sheets. Each thickness of the sheets is built up from a number of "books".

These techniques of mitering and step lap construction are known in the industry.

It is necessary to manufacture the core, therefore that the lengths of the sheets forming the legs and the yokes are cut very accurately and with the above stated variations in length. Each of the layer pieces also includes a pair of punched holes at a constant point on the leg and the yoke so that these punched holes can be used for alignment. Thus the distance between the end of the yoke and the punched hole varies for each layer.

The sheets are formed on a sheet cutting machine which includes a dereeling station for unwinding a layer of a predetermined width from a reel of that layer. The sheet cutting machine then forwards the unreeled layer to a plurality of cutting stations. The cutting stations of the conventional machine include a miter cutting blade which generally can move from a position at right angles to the length of the layer to a position at 45° on either side of the right angle position. This allows cutting directly at right angles and also the two directions of miter cut across the full width of the layer. A second cutting device comprises a V-blade which is arranged to cut the V-shaped miter for the central leg at the centre pan of the top and bottom yoke. In addition to the miter shear and the V-shaped shear it is also necessary to provide a hole punch for punching the alignment holes. All of these cutting devices must be very carefully controlled in association with the feeding mechanism which moves the sheets longitudinally in order to accurately control the length of the sheet, the depth of the V-cut and the position of the punched hole.

The conventional machine is thus set up initially so that it takes a first sheet of a first width and forms alternately a first end leg and a bottom yoke until a plurality of those elements have been formed. These are stacked as they are formed so as to form a stack of the first end legs and a stack of the bottom yokes. Subsequently the direction of miter is reversed so as form alternately the top yoke and the second end leg and these are stacked. Finally the machine is set up to manufacture this central leg. When all of the pieces have been stacked, these are maintained in inventory until required. When required they are transported to a core stacking location where basically the cores are stacked manually. The persons involved in stacking the cores take each book of layers defining the bottom yoke and place them on a stacking table. A book of sheets of each of the legs is then brought into position and inter-leaved with the book of sheets of the bottom yoke. This is repeated using a number of books in the range 5 to 150 until the required thickness is built up. This process is repeated using further books of a different width until the full cylindrical core structure is built up.

This arrangement has the disadvantage that the machine necessary for cutting the sheets is necessarily a massive machine since it must provide separately the different cutting techniques and since it must have sufficient room for stacking the books of sheets. This technique has the further disadvantage that it requires a significant level of inventory since it is more economic to manufacture a large number of sheets of a first predetermined width before resetting the machine for the next run. Furthermore, the stacking of the cores is done effectively manually which requires a high labour content and may limit the accuracy which is available due to human fallibility.

It is one object of the present invention, therefore, to provide an improved cutting shear for use with sheet material which is particularly but not exclusively for manufacturing sheets for formation into a transformer core.

It is the second object of the invention to provide an improved method of forming a transformer core.

According to the first aspect of the invention there is provided a shear for cutting reeled sheet material comprising a unreeling station having a stand for receiving a reel of the sheet material and feed means for withdrawing the sheet material from the reel and forwarding the sheet material in a feed direction, control means for controlling actuation of the feed means for intermittent forwarding movement of the sheet material, and a shear head for acting on the sheet material downstream of the feed means, the shear head having four separate shear blades lying in a plane parallel to the sheet material and moveable at right angles thereto to effect a shearing action thereon, the shear blades being arranged in an X-shape meeting at a central point of the shear blades with each shear blade extending outwardly from the central point at an angle to the feed direction to a position beyond an outside edge of the sheet material and with the blades being arranged in two pairs with each of the pairs lying in a common line at an angle to the common line of the other of the pairs, and means for selectively operating each of the shear blades independently, said control means being arranged to actuate selected ones of the shear blades simultaneously to simultaneously cut a required shape in the sheet material.

According to the second aspect of the invention there is provided a method of a method of manufacturing a fully mitered, step lap core for a transformer, the core comprising a bottom yoke, a first end leg, a central leg, a second end leg and a top yoke, each comprising a substantially cylindrical body formed from a plurality of thin sheet of sheet metal laid face to face, each of the first end leg, central leg and second end leg being parallel and arranged at right angles to the top yoke and the bottom yoke, the method comprising:

The use of the X-shear provides a flexibility of manufacture of the sheets so that the sheets for the five separate elements of the core can be manufactured sequentially and then stacked simultaneously. This technique therefore avoids the inventory problems since the core can be stacked substantially simultaneously with the cutting of the sheets. Furthermore the stacking can be effected by the machine without the necessity of human operation in aligning the separate layers and the manual labour which is often necessary for the conventional stacking processes. Furthermore the use of the X-shear provides a highly compact and simple arrangement thus reducing the massive nature of the machine relative to the conventional machines.

One embodiment of the invention will now be described in conjunction with the accompanying drawings in which

DETAILED DESCRIPTION

Figure 1:
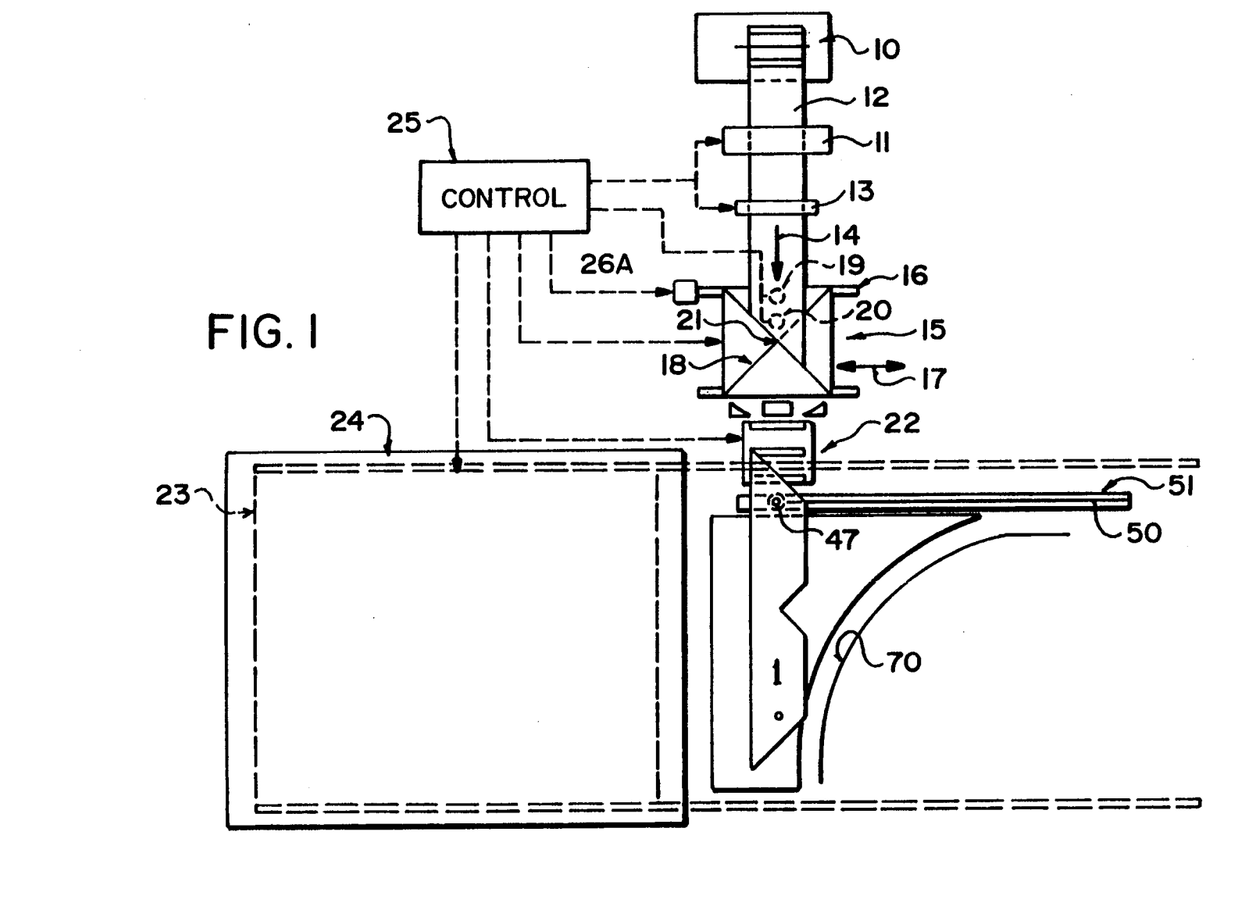
FIG. 1 is a schematic top plan view of an apparatus according to the present invention including the X-shear and the system for stacking the sheets.

The apparatus as a whole is shown schematically in FIG. 1 comprising an unreeling section 10 for receiving a reel of sheet material of a pre-determined width. Downstream of the unreeling section 10 is provided a feed device 11 for driving the unreeled layer 12 forwardly in a feed direction. The feed device 11 includes subsequent control rollers 13 so that the layer 12 is accurately and carefully driven in the feed direction 14 at a pre-determined transverse location on the drive system. The apparatus further includes a shear head generally indicated at 15 which is mounted on slide blocks 16 for limited side to side movement of the shear head in the direction of the arrows 17 that is transverse to the feed direction 14. The shear head includes an X-shear 18 described in more detail hereinafter together with a pair of hole punches 19 and 20 positioned upstream of the centre point 21 of the X-shear.

Downstream of the shear head is provided a discharge support generally indicated at 22 onto which cut sheets are deposited from the feed system as they emerge from the shear head. In addition the apparatus includes an overhead transport carriage 23 for lifting the sheets from the discharge support and for transporting the sheets onto a core stacking table 24 along side the discharge support.

A control unit 25 is provided using computer control techniques which is programmable to control the forwarding movement of the feed system 11, 13, the operation of the hole punches 19 and 20, the operation of the X-shear 18, the movement of the discharge support 22 and the operation of the overhead transport carriage 23. These different elements can therefore be accurately controlled to control the length of the cut sheets, the location of the punched holes, and the movement of the sheets relative to their ends and the punched holes subsequent to the discharge from the shear heads.

Figure 4:
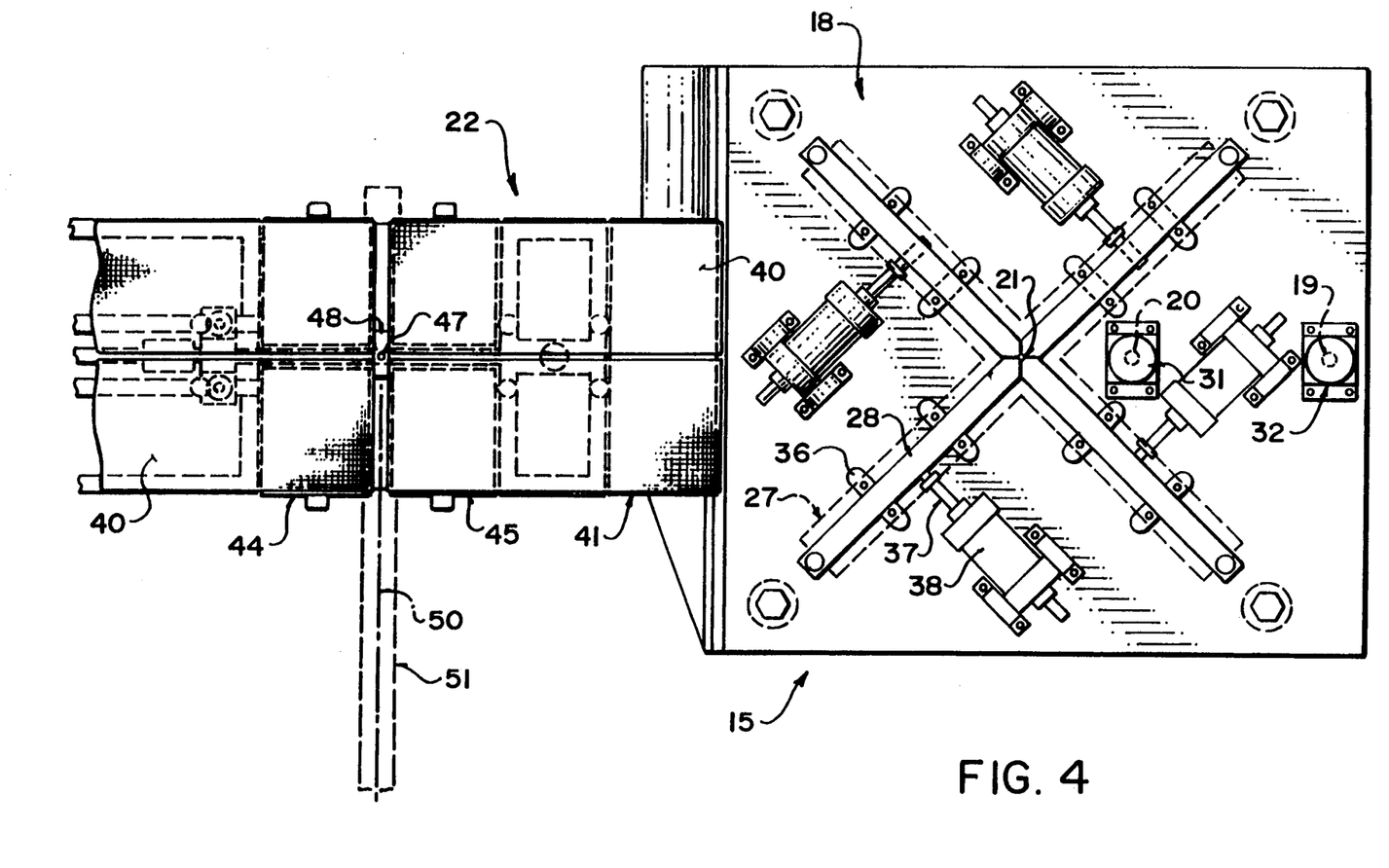
FIG. 4 is a top plan view of the X-shear and a first part of the transport and stacking system of the apparatus of FIG. 1.
Figure 5:
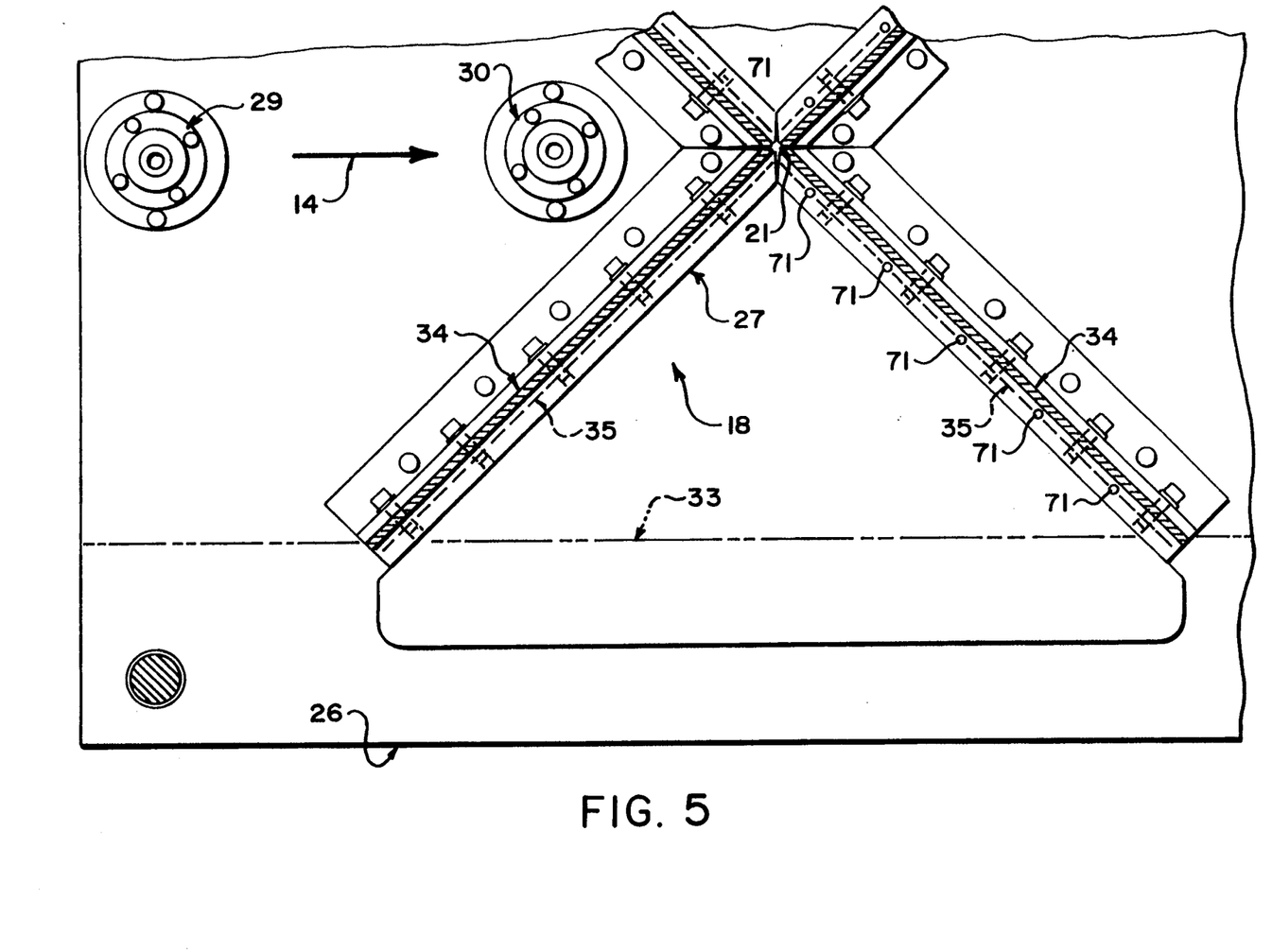
FIG. 5 is a top plan view of the bottom anvil portion of the X-shear of FIG. 4.

Turning now to FIGS. 4 and 5, further detail is shown of the X-shear 18. The X-shear is mounted on a carriage 26 which is moveable side to side on the block 16 under control of a stepping motor 26A. The carriage supports a lower shear anvil arrangement 27 together with upper shear blades 28 shown in FIG. 4. Furthermore the carriage carries anvils 29 and 30 for the hole punches together with the hole punch actuating members 31 and 32 shown in FIG. 4. The details of the blades, anvils and hole punch drive mechanisms are not shown but these will be apparent to one skilled in the art.

In general the X-shear 18 includes four separate shear blades which converge to the central point 21. The X-arrangement thus provides two pair of the blades with each pair lying on a common line passing through the central point 21 with the lines at right angles. Each blade extends from the central point outwardly to a position just beyond the outermost width 33 of the allowable widths of material to be cut.

As shown in FIG. 5, each anvil of the four shear blades includes an anvil plate 34 against which the shear plate 35 engages as shown in the dotted line in FIG. 5.

The shear plates are mounted for vertical movement as shown in FIG. 4 and carry on suitable slide supports 36 driven by over centre linkage arrangements 37 operated by pistons 38. The pistons 38 are double acting but a single stroke of the piston operates on the over centre linkage to drive the blade downwardly in the cutting action and then to draw the blade back upwardly to the retracted position. Each blade has a separate drive system so that it can be operated independently under the control of the control device 25. However the blades can be operated simultaneously so that two, three or four of the blades can be operated simultaneously as actuated by the control device 25. It will be appreciated that operation of two of the blades on the same side of the centre point will effect the cutting of a V-shape from one side of the layer. The operation of two blades lying along one line will form a miter cut across the layer with a direction of the miter cut depending upon which two of the blades are selected. Operation of three of the blades will provide a miter cut on one layer and a V-shape at the next adjacent layer piece.

Figure 3:
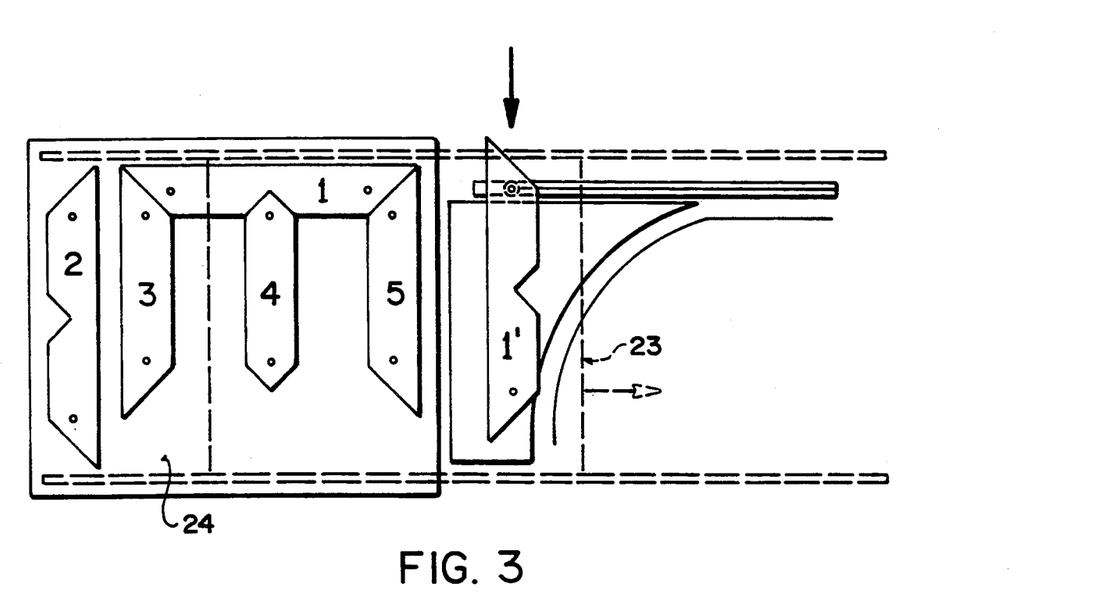
FIG. 3 is a view similar to FIG. 2 showing a final stage of first sequence of the stacking process.

A brief analysis of the situation by the reader will appreciate that these different cutting actions are required to produce the shapes for the separate lap sheets which are shown in FIG. 3.

The hole punches 19 and 20 are operated to punch alignment holes in the sheets pieces and also to punch a hole which is moved to the centre point 21. Two hole punches are provided since this enables simpler operation of the device with fewer stops of the feed mechanism to locate the material at the required location for operation of the various elements. However a single hole punch can also be used with the feed arrangement being halted where necessary to punch the alignment holes and also the holes for the centre position 21 of the X-shear. Thus when a hole is punched in the sheet upstream of the central point 21, the sheet is then moved forwardly by a distance sufficient to move the punched hole to the central position at which time the selected ones of the shear blades are operated with the hole at the centre point 21 operating to remove the material at the junction between the blades allowing the blades to cut into the punched hole without any necessity to cut through the centre point.

The hole punches and the shear blades are mounted commonly on the shear head for side to side movement as previously described so that the hole punched moves longitudinally of the feed direction to the centre point regardless of the side to side movement of the shear head.

In order to allow the second piece to move forwardly from the X-shear after a sheafing action, a plurality of pins 71 are actuated in the shear anvil shown in FIG. 5 so as to lift up the cut edge of the layer after the lap is removed to lift this over the two trailing anvils. It be noted from the position of the blade 35 that the cutting action causes the trailing edge of the layer to be deposited behind the two trailing anvils and therefore it is necessary to lift the front edge upwardly over these two trailing anvils so that the front edge can move forwardly to allow the layer to be properly fed.

Figures 6, 7:
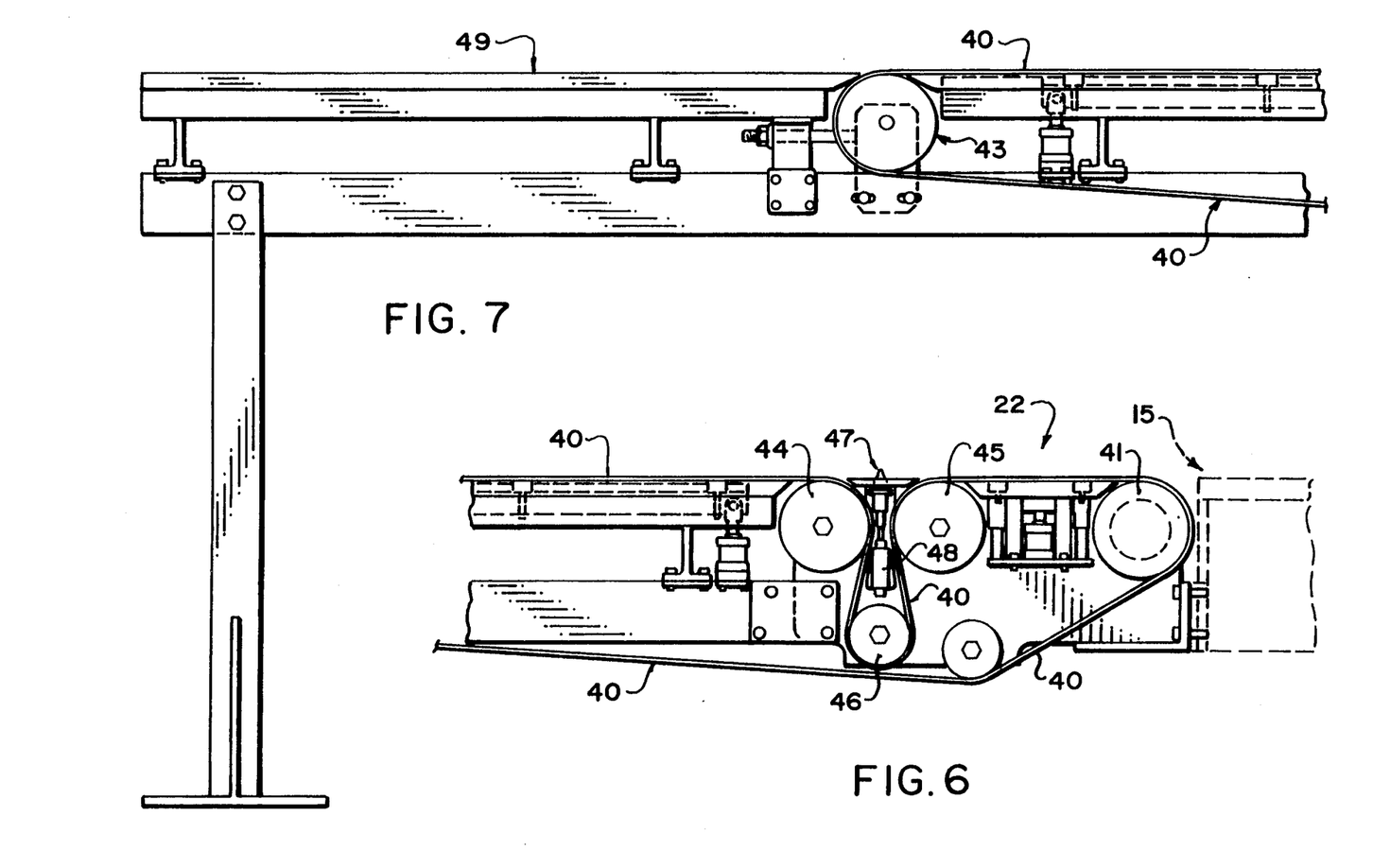
FIG. 6 is a side elevational view of a first part of the stacking and transport system of FIG. 4.
FIG. 7 is a side elevational view of a second part of the stacking and transport system.
Figure 8:
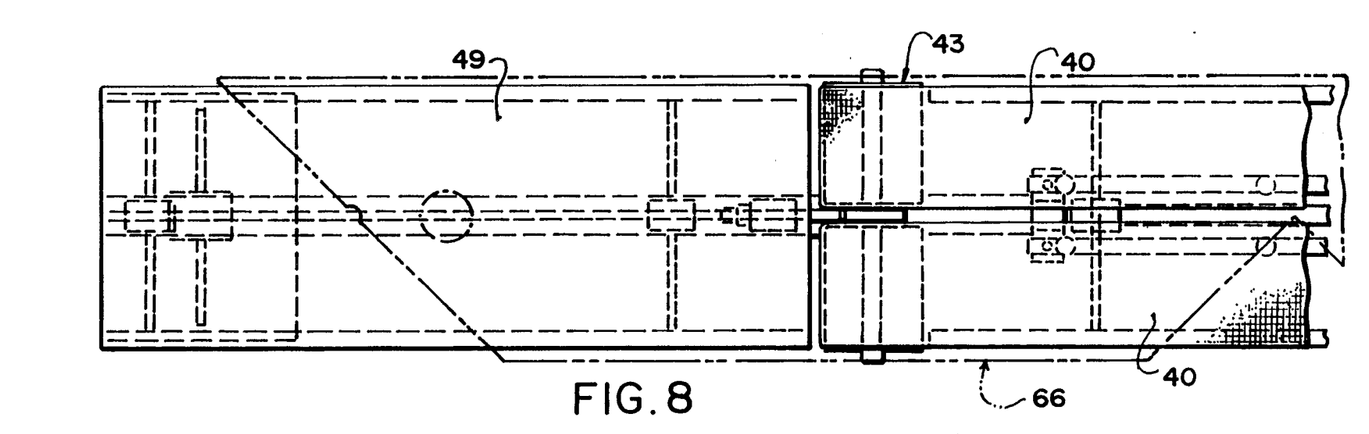
FIG. 8 is a top plan view of the part of the apparatus shown in FIG. 7.

Downstream of the shear head as shown in FIGS. 4 and 6 is provided the discharge support generally indicated at 22. This comprises a conveyer belt system including a belt 40 and a plurality of drive rollers 41. A plurality of magnets pull the forward end of each sheet, prior to cutting of its rear end, onto the first part of the belt. Thus when cut, the belt can move the sheet forwardly to the required position without slipping. The belt wraps around a front end roller 42, a rear end roller 43 (FIG. 7) and intermediate rollers 44 and 45. Between the rollers 44 and 45 the belt 40 extends downwardly under an idler roller 46 so as to allow a locating pin 47 to be positioned in the space between the rollers 44 and 45. Locating pin 47 is mounted on an actuator 48 which allows it to be moved vertically from a retracted position beneath the plane of the belt to a location position pushed above the plane of the belt for engagement into a locating hole in the sheet.

At the end of the support beyond the rear belt roller 43 is provided a support table 49 onto which the sheet can slide from the belt.

The pin 47 and the actuator 48 are mounted upon a track not shown in FIGS. 4 and 6 but visible in FIG. 1, the track being indicated at 50. Thus the discharge support includes mainly the belt and support table but also includes a support table portion 51 extending outwardly to one side from the belt.

The stacking support 24 is shown only schematically in FIG. 1 and this is positioned to one side of the discharge support including the belt 40. The stacking support comprises basically a horizontal surface and preferably this can be moved vertically on a suitable drive system to maintain an upper surface of stacked layers at a required pre-determined height. Thus as further layers are stacked, the surface is lowered to maintain the upper surface of the uppermost layer at the pre-determined height.

Figures 9, 10:
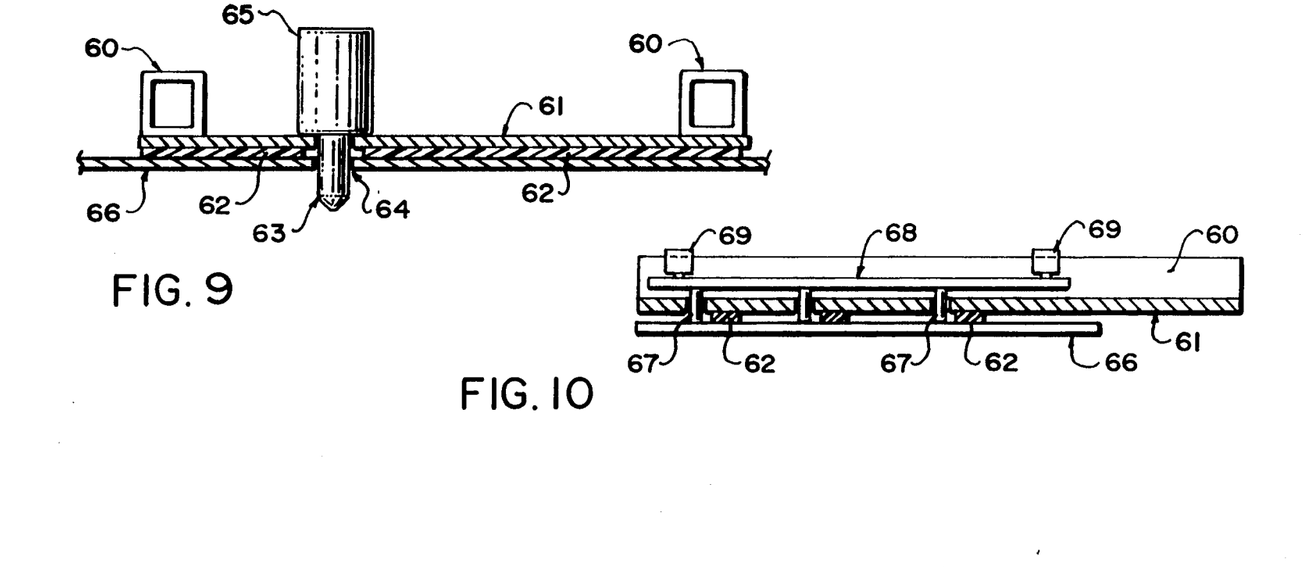
FIG. 9 is a cross-sectional view through one part of the transportation carriage of FIG. 1.
FIG. 10 is a cross-sectional view taken at fight angles to the cross-section of FIG. 9.

The overhead conveyer 23 is shown only schematically in FIG. 1 but more details are shown in FIGS. 9 and 10. This includes a frame 60 on which is mounted a base plate 61. On the underside of the base plate 61 is carried a plurality of magnetic strips 62 which are adhesively attached to the base plate and provide a magnetic surface facing downwardly for engagement with one of the metal sheets carried on the belt 40. The overhead carriage can be moved vertically by a distance sufficient just to move the magnetic strips from a position away from the metal sheet to a position sufficiently close to the metal sheet to attract the metal sheet into engagement with the magnetic strips. Sufficient magnetic strips are provided to support the metal layer including all the sheets along its full length without bowing and to maintain it accurately at the position from which it is picked up to maintain its orientation and location. The carriage further includes a locating pin 63 which can be inserted through the locating hole 64 in the sheets to further control the orientation and position of sheet. The pin 63 is retractable by an actuating mechanism 65.

To actuate release of the metal sheet indicated at 66 from the magnetic strips there are provided a plurality of pins 67 which can be moved vertically downwardly to push the metal sheet away from the magnetic strip 62 sufficiently to release the sheet. The pins are mounted on a cross bar 68 actuated by means 69 shown schematically.

In operation, a first reel of the required metal layer of a pre-determined first width is selected and mounted on the dereeler 10. The machine is then set up so that the metal sheet material drawn from the reel is fed in the feed direction 14 as previously described. The control device 25 is programmed to produce sequentially each of the sheets necessary to form one layer of the core. Thus the X-shear is actuated as required to produce sequentially the bottom yoke, top yoke, first end leg, centre leg and second end leg in that order. It is appreciated that the control necessary to effect the necessary cut lines can be programmed so that the movement of the sheet material is properly timed in relation to the hole punches and the operation of the separate blades to form these pieces.

As the shear is actuated to complete the transverse cut forming the necessary sheet, the sheet is drawn forwardly from the shear head by the drive belt 40 to take up position on the discharge support. As shown in FIG. 1, the first piece to be formed is the bottom yoke indicated at No. 1 and when this piece is moved into position on the belt, the pin 47 is actuated to move vertically upwardly into the locating hole 64 in the sheet. The pin 47 is then moved in the track 50 at fight angles to the feed direction to pull that end of the bottom yoke outwardly to one side while the other end of the bottom yoke is guided by a magnetic guide track 70 to take up a position at right angles of the position shown in FIG. 1 with the long back edge of the bottom yoke facing toward the shear head. The movement of the pin 47 is such as to move the bottom yoke just away from the belt 40 so that the belt 40 is again open to receive the next sheet.

Figure 2:
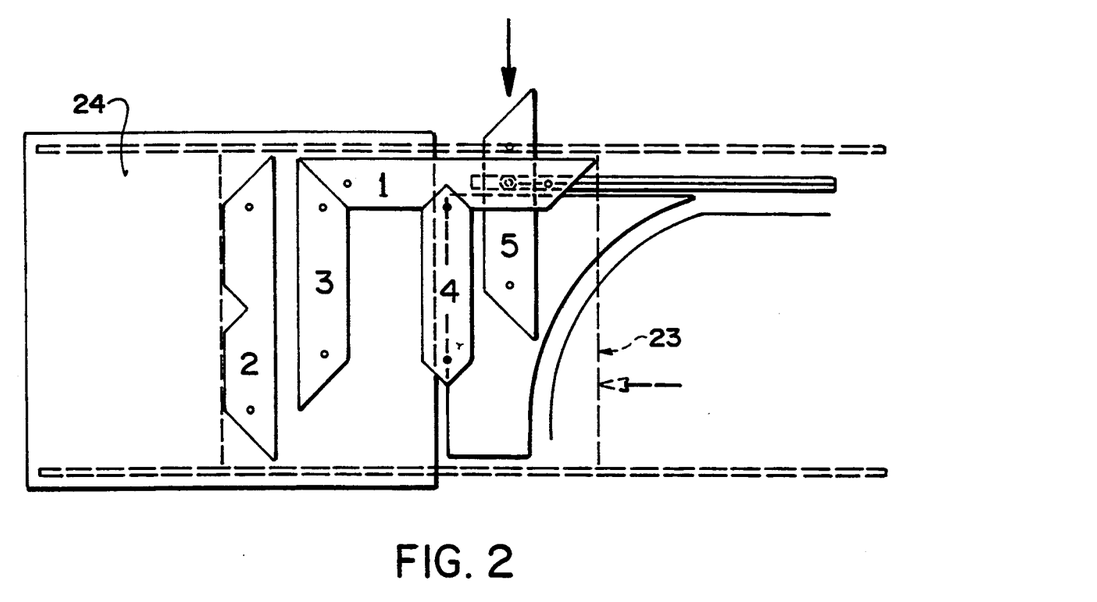
FIG. 2 is a similar schematic top plan view of the second part only of the apparatus of FIG. 1 showing a further stage of the stacking process.

The next sheet to be formed is piece indicated at No. 2 which is a top yoke and this is simply deposited onto the belt so as to lie at fight angles to the piece number 1 which is the bottom yoke. The relative position of these pieces is shown in FIGS. 2 and 3.

After the first and second pieces have been laid on the discharge support, these two pieces are lifted simultaneously by the overhead carriage by movement of the carriage to a position where the pins on the carriage engage into the locating holes in the pieces No. 1 and No. 2 and then the carriage is moved to engage the pieces with the magnetic strips allowing the pieces to be lifted away from the discharge support.

The next piece to be formed is piece No. 3 which is the first end leg. This piece is moved onto the discharge support with the movement taking place to move the trailing edge of that leg to a required distance along the discharge support in the direction of feeding. With the third piece in this position, the carriage can be moved while carrying the No. 1 and No. 2 pieces so that the piece No. 3 is positioned at its required location relative to the piece No. 1. The carriage includes a further locating pins cooperating with the holes in the piece No. 3 so as to ensure its proper location before it is lifted. Once located, the piece No. 3 can be engaged by the carriage and lifted upwardly.

The sequence then continues by the formation of the piece No. 4 which is the centre leg and subsequently the piece No. 5 which is the second end leg. As explained above these pieces are located on the discharge support at the required locations and are lifted by the carriage. In each operation, the carriage is moved to transfer the pieces which are already being carded to the required location relative to the piece which is on the discharge support. When properly located the piece on the discharge support is then lifted from the discharge support and carried with the pieces already on the carriage.

When all five pieces have been lifted, the carriage moves to the position overlying the stacking support and the carriage is lowered onto the stacking support so that the locating pins 63 which project through the sheets carried on the carriage can engage into the locating holes in the sheets already laid. This ensures a proper positioning of each sheet on top of the next previous sheet. When properly located, all of the sheets are simultaneously released from the carriage by operation of the release bar 68 which drives the pins 67 downwardly to push the laps away from the magnetic strips 62.

It will be noted that the first, third, fourth and fifth pieces are stacked automatically and simultaneously to form the bottom yoke, first end leg, central leg and second end leg simultaneously thus forming a single layer which is simultaneously applied onto the forming core. The second lap is positioned along side the structure since the top yoke must be formed separately for subsequent application when the remainder of the core has been properly stacked and the wound coils attached onto the legs.

After a first layer is applied by the sheets layed simultaneously, the process is repeated using the same width of material to form a plurality of the layers as one step or book of the layer having the stepped overlap as explained previously. The process is then repeated to build up a plurality of books. The material is then changed to a second width of material and the process repeated using the material of the second width.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A shear for cutting reeled sheet material comprising an unreeling station having a stand for receiving a reel of the sheet material and feed means for withdrawing the sheet material from the reel and forwarding the sheet material in a feed direction, control means for controlling actuation of the feed means for intermittent forwarding movement of the sheet material, and a shear head for acting on the sheet material downstream of the feed means, the shear head having four separate shear blades lying in a plane parallel to the sheet material and moveable at fight angles thereto to effect a shearing action thereon, the shear blades being arranged in an X-shape meeting at a central point of the shear blades with each shear blade extending outwardly from the central point at an angle to the feed direction to a position beyond an outside edge of the sheet material and with the blades being arranged in two pairs with each of the pairs lying in a common line at an angle to the common line of the other of the pairs, and means for selectively operating each of the shear blades independently, said control means being arranged to actuate selected ones of the shear blades simultaneously to simultaneously cut a required shape in the sheet material.

2. The shear according to claim 1 including hole punch means upstream of the shear blades aligned with the central point, said control means being arranged to punch a hole in the sheet material and to move the hole to the central point.

3. The shear according to claim 2 including second hole punch means aligned in the feed direction with the first hole punch means and the central point.

4. The shear according to claim 2 wherein the hole punch means is mounted on the shear head and wherein is provided means for causing relative side to side movement of the shear head and the feed means to move the central position relative to the side edges of the sheet.

5. The shear according to claim 1 wherein each shear blade comprises a top shear plate and a bottom shear anvil and wherein the bottom shear anvil of each of a downstream ones of each pair of shear blades includes lifting means located forwardly of the respective bottom shear anvil for lifting the sheet material over the bottom shear anvil subsequent to the shearing action.

6. The shear according to claim 5 wherein the lifting means comprises a plurality of pins moveable vertically and means for actuating upward movement of the pins subsequent to a shearing action.

* * * * *